(No Model.) 3 Sheets—Sheet 1.
J. MATTHEWS, Dec'd.
E. & G. MATTHEWS, executors.
DISPENSING APPARATUS FOR AERATED BEVERAGES.
No. 305,945. Patented Sept. 30, 1884.
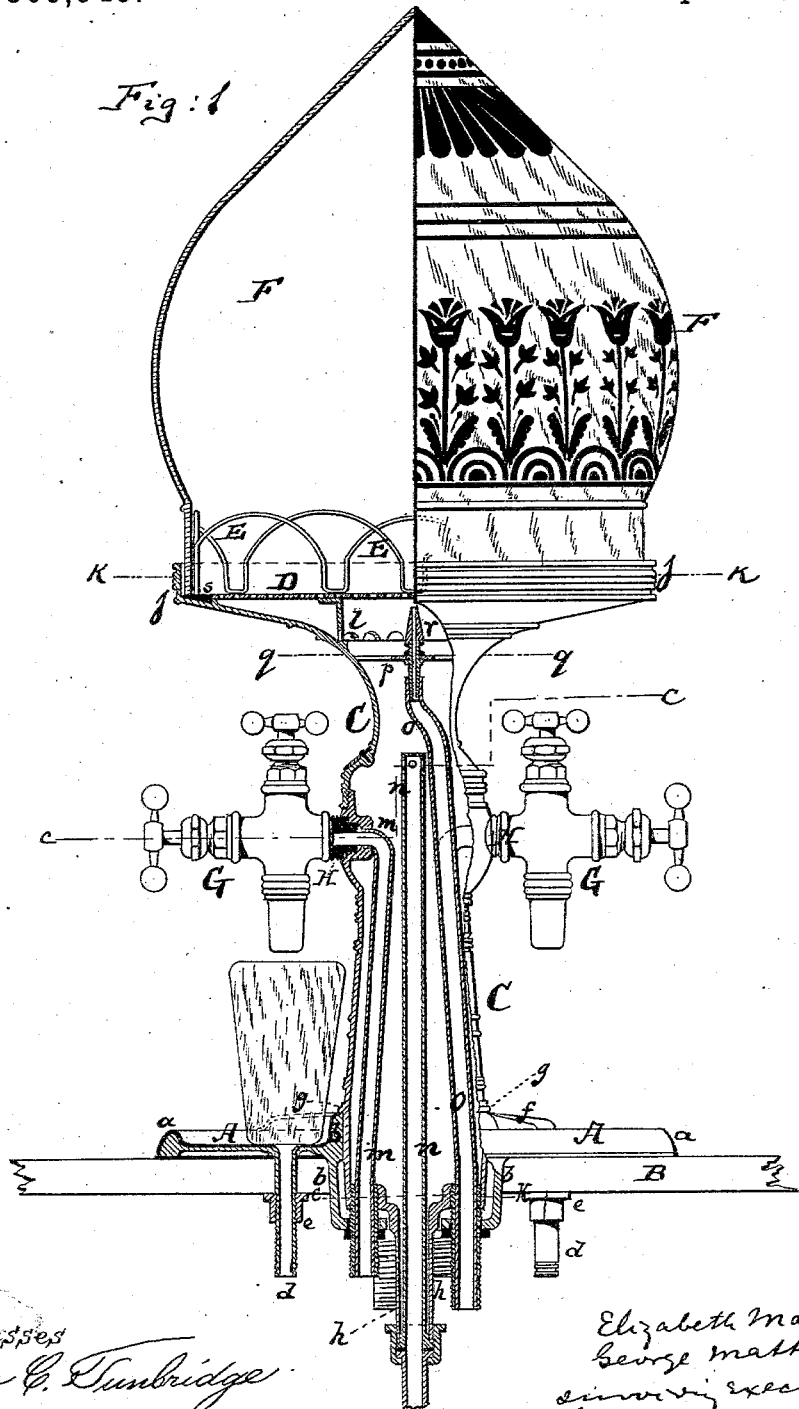
Witnesses
John C. Tunbridge
John M. Speer.
Elizabeth Matthews
George Matthews
surviving executors of
John Matthews deceased
by their attorneys
Briesen & Steele (No Model.) 3 Sheets—Sheet 2.
J. MATTHEWS, Dec'd.
E. & G. MATTHEWS, executors.
DISPENSING APPARATUS FOR AERATED BEVERAGES.
No. 305,945. Patented Sept. 30, 1884.
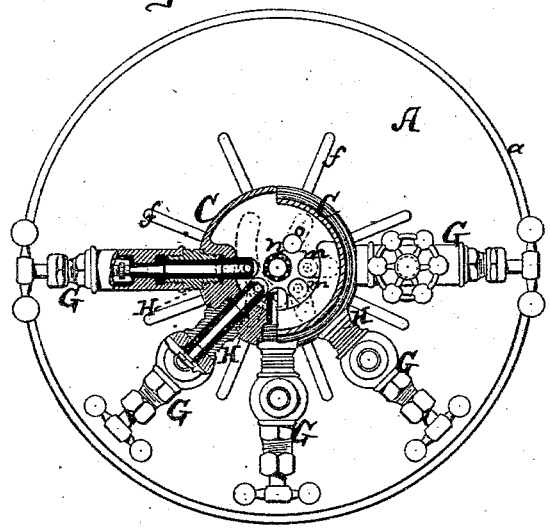
Fig: 2
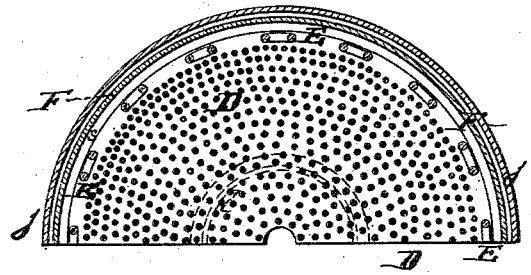
Fig: 3
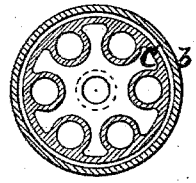
Fig: 4

(No Model.)  3 Sheets—Sheet 3.

J. MATTHEWS, Dec'd.
E. & G. MATTHEWS, executors.
DISPENSING APPARATUS FOR AERATED BEVERAGES.

No. 305,945. Patented Sept. 30, 1884.

Witnesses:
John C. Tunbridge
John M. Speer

Elizabeth Matthews
George Matthews
surviving executors of
John Matthews deceased
by their attorneys
Briesen & Steele

UNITED STATES PATENT OFFICE.

ELIZABETH MATTHEWS AND GEORGE MATTHEWS, OF NEW YORK, N. Y.,
EXECUTORS OF JOHN MATTHEWS, DECEASED.

DISPENSING APPARATUS FOR AERATED BEVERAGES.

SPECIFICATION forming part of Letters Patent No. 305,945, dated September 30, 1884.

Application filed August 31, 1883. (No model.)

*To all whom it may concern:*

Be it known that JOHN MATTHEWS, deceased, formerly a resident of New York, in the county of New York and State of New York, did invent an Improved Dispensing Apparatus for Aerated Beverages, of which the following is a full, clear, and exact description, reference being made to the accompanying drawings, in which—

Figure 5:
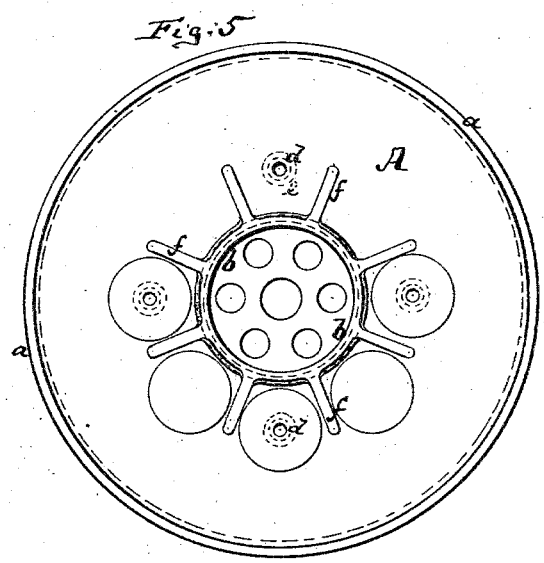
Figure 6:
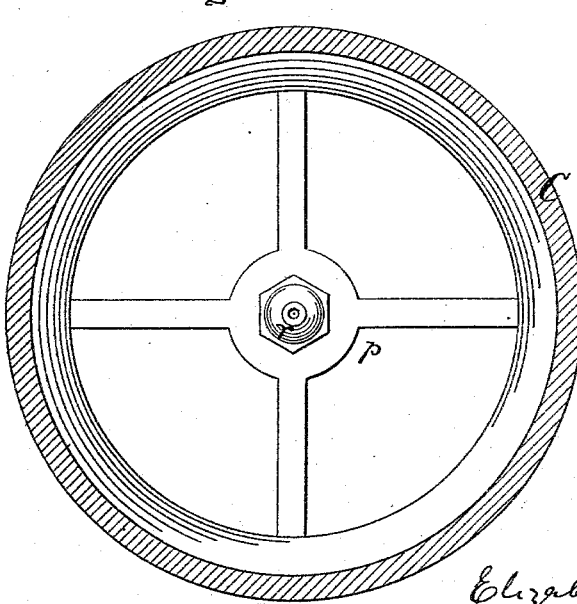

Figure 1 is a side elevation, partly in section, of the improved dispensing apparatus. Fig. 2 is a horizontal section of the same, taken on the plane of the line $c\ c$, Fig. 1. Fig. 3 is a horizontal section on the plane of the line $k\ k$, Fig. 1. Fig. 4 is a horizontal section on the plane of the line $c\ k$, Fig. 1. Fig. 5 is a top view of the bed-plate which is used in the apparatus. Fig. 6 is a horizontal section on an enlarged scale, line $q\ q$, Fig. 1, indicating the plane of section.

This invention relates to apparatus for dispensing soda-water, mineral waters, and other aerated beverages; and it consists, first, in constructing the overhanging top of the apparatus so that it may constitute a receptacle for the ice, by means of which the beverages are cooled, while at the same time said overhanging top constitutes an ornament and a receiver of a jet of water, if desired.

The invention also consists in other details of improvement that are hereinafter more fully specified.

In the drawings, the letter A represents the bed-plate of the apparatus, which has an elevated rim, $a$, and a central vertical socket, $b$, which extends above and below the body of the bed-plate, as indicated in the lower part of Fig. 1. This bed-plate is placed on a table, B, or other suitable support, and is connected therewith by means of hollow downwardly-projecting tubes $d$, that extend through the table B, and are provided below said table with clamping-nuts $e$. Around the socket $b$, where the same extends below the bed-plate A, are or may be radiating ribs $f$, which are clearly indicated in Fig. 5.

C is the tubular stem of the dispensing apparatus, the same being made of sheet metal or other suitable material of ornamental form, as indicated in Fig. 1, and of sufficient size in cross-section to make it a proper receptacle for the several supply-pipes that enter in the construction of the apparatus. This tubular stem rests by a projecting flange, $g$, on the upper end of the socket $b$, and enters also into said socket, as clearly shown in Fig. 1, the lower end of the stem C being provided with a downwardly-extending tube, $h$, which passes through the bottom of the socket $b$. The upper end of the tubular stem C is enlarged so as to form a dish-shaped top with an upright or nearly upright rim, $j$. Within this dish-shaped top is contained a horizontal perforated plate or diaphragm, D, which rests at its edge on the wall of the tubular stem, and which may also be further supported by suitable upright brackets, $l$, as shown at the left-hand side in Fig. 1. The plate D supports near its outer circumference a wire screen, E.

F is a bell or dome of glass or other material—glass being preferred—which is placed upon the dish-shaped upper enlargement of the column C, so as to rest on the said column, or on the plate D, and so also as to embrace the screen or wire guard E. It is preferred to place a rubber ring, $s$, into the upper part of the column for the glass F to rest on.

Through the bottom of the socket $b$ extend a series of pipes, some of which, $m$, are to connect with the discharge cocks or faucets G of the apparatus, while one of said pipes, which is marked $n$, constitutes the overflow-pipe to carry off the melted-ice water from the apparatus, one other pipe, $o$, serving to carry a current of water into the interior of the apparatus—that is to say, each pipe $m$ extends upward through the bottom of the socket $b$ and through the bottom of the column C into said column, and then is connected by suitable couplings with one of the faucets G. The center pipe, $n$, passes up and through the tubular extension $h$ of the column C into the center of this column to a point somewhat above the level of the faucets G, and is at its upper part perforated to receive from the apparatus the water which it is to carry away. The last pipe, $o$, extends through the bottom of the socket $b$ and through the bottom of the column C upward within said column and above the pipe $n$, the upper end of the pipe $o$ being stayed or braced in a cross-like inner framing, p, which is secured within the upper part of the column, as shown in Fig. 1, and as represented on an enlarged scale in Fig. 6. The upper end of the pipe o carries a nozzle, r, which, by preference, terminates directly below the perforated plate D.

Each faucet G is on its inner side lined with block-tin or other non-corrosive substance, and is connected to the column C by a screw-coupling, H, which is more clearly shown in Fig. 2, and which is also lined on its inner side with block-tin. This screw-coupling H screws into a socket or depression, which is provided for it in the body of the column C, as indicated in Fig. 2, and then receives at its outer end the faucet G, which is screwed to it. There is an advantage connected with the employment of the separate coupling-piece H for use on faucets that are lined with block-tin, because by its use the lining in the faucet becomes reduced in length and can be readily inserted and renewed whenever desired, while, if the faucet itself were made so long as to be directly screwed into the column C it would become very difficult to extract from it, in case of necessity, the block-tin lining and to reline it.

Fig. 4 shows clearly the appearance in horizontal section of the lower part of the column C, indicating the places for the several pipes m n o; but said pipes are not represented in Fig. 4. The pipes m n o are fixtures in the apparatus, and are to be coupled at their lower ends to the proper connections. In order to permit this to be done, in view of the fact that said pipes are rather closely massed at their lower ends, the extent to which they project below the socket b is made to vary, so that the coupling-nuts, which are applied to them in making the proper connections, will be on different planes and not in each other's way, and so also that said nuts can be more readily operated.

The operation of this apparatus is as follows: The pipes m are first connected to the proper fountains or vessels containing soda-water, mineral water, or other suitable aerated beverage; in fact, the beverage need not be aerated if the receptacle containing it is placed at a level above this apparatus. The pipe o is connected at its lower part with a water-supply pipe, so that a jet of water will be thrown by said pipe o and its nozzle r into the bell F, playing therein and keeping it cool, the water finally flowing through the plate D into the body of the column, in which it rises to such a height as to finally escape through the apertures in the upper part of the pipe n. Whenever desired, blocks of ice are placed upon the perforated plate D and within the circumference of the screen or guard E, and whenever such ice is employed its outline can be seen through the bell F, the water from the nozzle r playing around it and giving to the eye an impression of agreeable coolness. The water that passes away from the ice will rise in the column C, and surrounding the supply-pipes m serve to cool the soda-water or mineral water that is supplied to the faucets G. When ice is placed on this plate D, the jet of water need not be thrown. The guard E serves to confine the ice within its proper limits, and also to prevent it, when melting, from tumbling against the glass bell or receiver F. When the water that passes from the nozzle r is allowed to play around the ice on the tray D E, it will become so cool that as it stands in the lower part of the column C around the pipe n it will be at about the freezing-point, thus keeping the soda-water or other beverage cooler than in any other apparatus heretofore constructed.

We claim—

1. In dispensing apparatus, the combination of the hollow column C with the supporting bed-plate A, perforated top plate, D, guard or screen E, and bell F, substantially as herein shown and described.

2. The combination of the column C, having the rim j, with the perforated plate D, guard or screen E, bracket l, cross-frame p, water-supply pipe o, and nozzle r, substantially as herein shown and described.

3. In apparatus for dispensing soda-water or other aerated beverages, the detachable bell F, placed with its open end downward at the top of such apparatus, substantially as described, in combination with a perforated support for the ice, which support constitutes the bottom of said bell when in position, as set forth.

4. The combination of the perforated ice-supporting plate D with the screen E and detachable bell F, said screen being within said bell, which bell is placed with its open end downward upon said plate D, substantially as specified.

ELIZABETH MATTHEWS.
GEORGE MATTHEWS.

Witnesses:
EMILY MATTHEWS,
GEORGE HEALY.